United States Patent
Hoernicke et al.

(10) Patent No.: US 10,831,748 B2
(45) Date of Patent: Nov. 10, 2020

(54) OPTIMIZED METHOD FOR SORTING ALARMS

(71) Applicant: ABB Schweiz AG, Baden (CH)

(72) Inventors: Mario Hoernicke, Landau (DE);
Martin Hollender, Dossenheim (DE);
Steve Royston, Biggleswade (GB)

(73) Assignee: ABB SCHWEIZ AG, Baden (CH)

( * ) Notice: Subject to any disclaimer, the term of this patent is extended or adjusted under 35 U.S.C. 154(b) by 397 days.

(21) Appl. No.: 15/256,655

(22) Filed: Sep. 5, 2016

(65) Prior Publication Data

US 2016/0371327 A1 Dec. 22, 2016

Related U.S. Application Data

(63) Continuation of application No. PCT/EP2014/000575, filed on Mar. 6, 2014.

(51) Int. Cl.
*G06F 16/20* (2019.01)
*G06F 16/245* (2019.01)
*G05B 23/02* (2006.01)

(52) U.S. Cl.
CPC ......... *G06F 16/245* (2019.01); *G05B 23/027* (2013.01); *G05B 23/0272* (2013.01); *G05B 2219/24123* (2013.01); *G05B 2219/31437* (2013.01); *G05B 2219/31438* (2013.01)

(58) Field of Classification Search
CPC ............. G06F 17/30424; G06F 17/30; G05B 2219/24123; G05B 2219/31437; G05B 2219/31438; G05B 23/027; G05B 23/0272; G05B 23/02

USPC .......................................................... 707/752
See application file for complete search history.

(56) References Cited

U.S. PATENT DOCUMENTS

| | | | |
|---|---|---|---|
| 5,581,242 A | 12/1996 | Arita et al. | |
| 5,914,875 A | 6/1999 | Monta et al. | |
| 7,961,087 B2* | 6/2011 | Hoveida ............ | G06F 11/3072 340/500 |
| 9,355,477 B2* | 5/2016 | Ashley ............... | G05B 23/0272 |
| 2003/0046027 A1 | 3/2003 | Kitamura et al. | |
| 2006/0190584 A1 | 8/2006 | Skold et al. | |
| 2008/0117068 A1* | 5/2008 | Sandstrom ............ | H04L 41/06 340/635 |

(Continued)

FOREIGN PATENT DOCUMENTS

EP 1331536 A1 7/2003

*Primary Examiner* — Vincent F Boccio
(74) *Attorney, Agent, or Firm* — Leydig, Voit & Mayer, Ltd.

(57) ABSTRACT

A method for sorting alarm-messages of a plant having at least one alarm-area each having at least two plant-devices connected by at least one connection, wherein the at least one alarm-area is defined so that the plant-devices and the respective connection provide a directed graph, involves: providing at least one database containing alarm-data and topology-data; wherein the topology-data describe a directed graph having at least one connection with a related flow direction between the respective plant-devices of the respective assigned alarm-area; generating at least one partly complete first alarm-order of the alarm-messages of the at least one alarm-area by sorting the alarm-messages according to the flow direction of the directed graph.

12 Claims, 8 Drawing Sheets

(56) References Cited

U.S. PATENT DOCUMENTS

| | | | |
|---|---|---|---|
| 2009/0070880 A1* | 3/2009 | Harris | G06F 21/552 |
| | | | 726/25 |
| 2010/0019894 A1 | 1/2010 | Okada | |
| 2012/0041570 A1* | 2/2012 | Jones | G05B 19/0426 |
| | | | 700/17 |
| 2013/0002697 A1* | 1/2013 | Ashley | G06F 11/327 |
| | | | 345/589 |
| 2013/0232094 A1* | 9/2013 | Anderson | G05B 23/0229 |
| | | | 706/12 |
| 2015/0066435 A1* | 3/2015 | Basu | H04Q 9/00 |
| | | | 702/189 |

* cited by examiner

OPTIMIZED METHOD FOR SORTING ALARMS

CROSS-REFERENCE TO RELATED APPLICATIONS

This application is a continuation of International Application No. PCT/EP2014/000575, filed on Mar. 6, 2014, the entire disclosure of which is hereby incorporated by reference herein. The International Application was published in English on Sep. 11, 2015, as WO 2015/131916 A1 under PCT Article 21(2).

FIELD

The invention relates to a method for sorting at least two alarms of a plant, having at least one alarm-area with at least two connected plant-devices.

BACKGROUND

In the state of the art alarm messages of process and manufacturing plants are very important. Alarm messages are used to inform operators about dangerous states of a process or even of the entire plant in order to react accordingly and drive the process back into a normal state. Alarm messages are generated by plant-devices, for example sensors or pumps.

Hence, alarm-messages are used to indicate a required action to the operator. For example, when a tank level reaches a certain limit, an alarm is raised that shows that the tank reached a high level. According to the alarm-message and the respective message text that is shown to the operator, for example in an alarm list, the operator can act and, for example, open a valve and start a pump to decrease the level inside the tank. When an alarm appeared, it is usually visualized in an alarm list or it is visualized in a human machine interface directly at the device. Hence, the operator has then the chance to react on those alarms.

The term "plant-device" comprises every device which is able to create an alarm directly or indirectly, for example a pump, a valve or even a reactor. Today's plants usually have a considerable number of plant-devices.

The term "sorting" relates to all activities which are related to bring several alarms of different plant-devices in an order. In the state of the art, alarm-messages are time-stamped to get the order of the different alarms and show the operator which one is supposed to have appeared first in time.

Disadvantageously within the state of the art is, that several plant-devices in the plant are able to create alarms. Those alarm-messages are propagated very fast through the system which leads often to high alarm rates. As there might be a certain time span between the generation of the alarm-message and the time stamping it is often very inaccurate. Hence, often several alarm-messages have the same time stamp, therefore the alarm-messages cannot be sorted according to the allocated time-stamp properly and the first-up alarm is not detected automatically. Thus, the foreseen alarm-message rate of 10 alarms per 10 minutes is often exceeded and an operator can be overloaded with redundant alarms. Furthermore, the operator is required to evaluate the entire alarm-messages manually in order to get the root cause of the problem. Therefore the operator can not react immediately, which leads to unnecessary shut-downs and production losses.

The time-stamped based sorting of the alarm-messages might be inaccurate because the time-stamp can be inaccurate as:
  Fieldbuses or Modbus might add a time stamp very late and imprecise (e.g. in a time span of +/−4 seconds);
  Alarms might originate in different subsystems with clocks that are not synchronized;
  Process dynamics can cause delays. For example a reaction might increase the temperature, but it might take time until this increase reaches the sensor, e.g. because of the slow dynamic behavior of the vessel;
  Cycle times inside the controllers cause imprecision.

SUMMARY

An aspect of the invention provides a method for sorting alarm-messages of a plant having at least one alarm-area each having at least two plant-devices connected by at least one connection, wherein the at least one alarm-area is defined so that the plant-devices and respective connection provide a directed graph, the method comprising: a) providing at least one database including alarm-data and topology-data, the alarm-data at least partially describing a relationship between respective plant-devices and respective assigned alarm-area, and the topology-data describing a directed graph including a connection with a related flow direction between the respective plant-devices of the respective assigned alarm-area; b) retrieving the alarm-messages from the plant-devices; c) associating, at least in part, the alarm-messages with a respective alarm-area according to the alarm-data; d) generating at least one partly complete first alarm-order of the alarm-messages of the at least one alarm-area by sorting the alarm-messages according to a flow direction of the directed graph, and by assigning sorted alarm-messages to the first alarm-order; and e) storing at least a first-up alarm-message of the first alarm-order.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
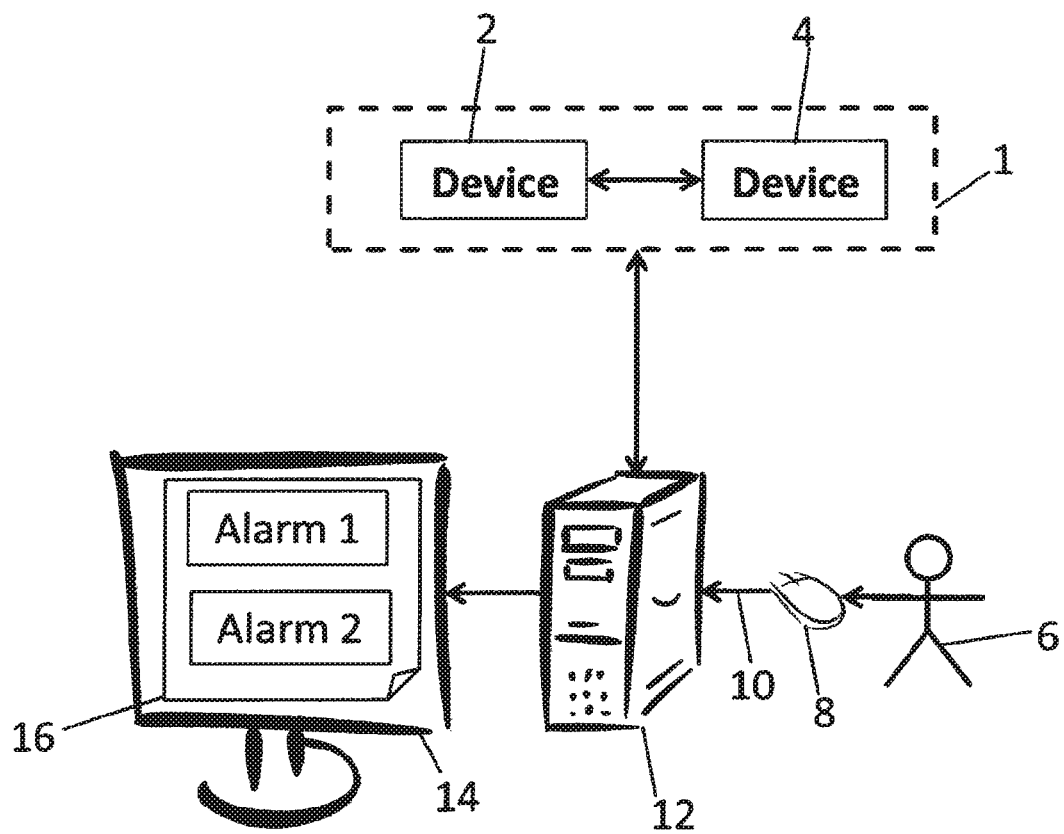
FIG. 1 an exemplary computing unit for running a method according to the invention.

Based on this state of the art it is an aspect of the invention to provide a method to improve the sorting of alarms.

An objective is accomplished according to the present invention by a method for sorting alarm-messages of a plant having at least one alarm-area each having at least two plant-devices connected by at least one connection, wherein the at least one alarm-area is defined so that the plant-devices and the respective connection provide a directed graph, comprising the following steps:
  a) providing at least one database containing alarm-data and topology-data; wherein
    the alarm-data describe at least in part the relation between the respective plant-devices and the respective assigned alarm-area;
    the topology-data describe a directed graph comprising at least one connection with a related flow direction between the respective plant-devices of the respective assigned alarm-area;
  b) retrieving alarm-messages from plant-devices;
  c) associating, at least in part, the alarm-messages with the respective alarm-area according to the alarm-data;
  d) generating at least one partly complete first alarm-order of the alarm-messages of the at least one alarm-area by sorting the alarm-messages according to the flow direction of the directed graph;
    assigning the sorted alarm-messages to the first alarm-order;
  e) storing at least the first-up alarm-message of the first alarm-order.

In the following, the term "first-up alarm-message" is referred to as an alarm-message of the plant-device which is in the first position in the flow-direction of the plant. This is often the most important alarm-message, since it shows the root cause plant-device which causes the following depending alarm-messages. In the following the term "alarm-message" is often shortened as "alarm".

The term "directed graph" refers to the dependencies and relationships between the different plant devices in the plant.

The term "flow direction" refers to the direction of the directed graph, wherein the direction is determined for example from a material flow, an energy flow or an information flow.

The term "alarm-area" refers to a defined area which comprises at least two plant devices. The alarm-area can be defined in that way, that an unambiguous directed graph is defined therein. The alarm-area comprises usually a tree structure, which enables advantageously the finding of the root-cause, in this case the first-up alarm. A tree-structure is a hierarchical structure, with a root node as a parent node and subtrees of children represented as a set of nodes which are linked by edges. A tree-structure is a linked tree with a group of nodes, wherein each node represents a plant-device and a list of references to other nodes, advantageously to its children nodes. The hierarchy of the tree-structure is advantageously used for sorting the alarm-messages automatically.

As each plant device might generate at least one alarm-message in an alarm-area a group of alarm-messages might occur therein.

In contrast to the state of the art, the alarm messages are sorted according to the flow direction within the plant topology and not according to the time-stamping. Advantageously, time stamping is not required anymore and the problems with inaccurate time-stamping are circumvented.

The invented method uses the directed graph with the respective flow direction to navigate from specific alarm-messages backward in the flow direction to evaluate whether an alarm has been propagated through the system from a plant-device which is in a topological earlier point located. Based on this, the invented algorithm is applied to determine which alarm-message appeared first and which alarm-message is a follow-up alarm-message. In conclusion, it is a time-stamp independent method of sorting alarm-messages.

Advantageously, the operator does not need to evaluate the consistency of the generated alarm-order by comparing it with the plant-topology manually. As the alarm-order is generated automatically by the invented method it becomes increasingly trustworthy. Furthermore advantageously, an operator is provided faster with the information which is the first root cause plant-device. This enables the operator to solve the problem quicker and restore the plant to normal operating conditions. Hence, the downtime of the plant due to late reaction of the operator is effectively reduced.

The invented method is a model based time independent method which is typically running on a computing-unit, for example a usual personal computer or a processing-unit of the plant. Therefore the time stamping becomes obsolete and the amount of required time-measurement hardware is also reduced. Of course a combination of the sorting according to the flow direction and according to the time-stamping is further possible and might be combined. In case of contradictory results of the different sorting methods the topology-dependent sorting can be advantageously ranked higher.

According to a preferred development of the invention the directed graph is reduced to the relevant plant-devices which are generating alarm-messages, before the step of generating the at least one partly complete first alarm-order.

Hence, the directed graph of the flow is reduced to the relevant plant equipment that raised an alarm and the respective connections. The relevant plant-devices are also referred to as nodes and the respective connections are also referred to as edges of the tree-structure of the directed graph. As only the relevant nodes and edges are taken into account, the comparing of the alarm-messages and therefore the finding of the relevant first-up alarm is significantly accelerated with the same available processing power of the computing-unit.

In another advantageous development a diagram of the plant and at least one respective alarm-area template is provided for defining the at least one alarm-area at least partly automatically, wherein the alarm-area template comprises information relating to a structure of a typical alarm-area with typical plant-devices and/or connections. It is characterized by the further steps:
  searching plant-devices and/or respective connections from the diagram according to the structure of at least one alarm-area template;
  assigning the at least partly recognized plant-devices and/or respective connections to sections of the structure of the respective alarm-area template;
  defining the at least one alarm-area at least partly automatically by allocating the plant-devices and/or respective connections of the respective alarm-area template.

By searching plant devices and/or respective connections automatically from the provided diagram according to the structure of at least one alarm-area template the generation of alarm-areas is automated and therefore advantageously accelerated. Due to the automatic definition the accuracy of the alarm-area definition is furthermore advantageously increased.

The alarm-area template contains information about the structure of the plant-devices and the respective connections. Hence, the alarm-area template describes already a certain alarm-area. An alarm-area template comprises sections, wherein each section typically defines a placeholder for a specific plant-device or a connection. The structure of the sections is exemplary stored in a table or an array.

The respective records of the table or the array define the plant-devices and the respective connections of the alarm-area. Furthermore advantageously, a tree-structure of the directed-graph of the respective alarm-area is incorporated in the records. Hence, the assignment of the plant-devices and the connections to the alarm-areas is advantageously generated automatically. For each instance of a template alarm-area, an alarm area is created which is further used to group the alarm-messages. In case that the assignment of the plant-devices and the connections to the alarm-areas cannot be fully automated, missing parts can be added by manual intervention of the user.

The provided diagram can exemplary be a Human Machine Interface (HMI) diagram of the plant, wherein the graphics and object information of the HMI are reused for the generation of the alarm-area. An HMI diagram of the plant or a sub-part thereof is typically available in an early stage of the engineering phase of a plant since the sub-parts are usually engineered individually from each other. An HMI diagram is a graphic which is presented to a user for further interaction during operation of a plant. Although not all the necessary information must be present in the HMI, at least large parts of the alarm-area can be advantageously generated from it.

According to another exemplary development of the invention a method of pattern recognition is foreseen to detect elements such as plant-devices and/or connections such as valves, flow pipe segments, tanks pumps, drives or sensors.

The computer readable form of the HMI diagram is preferably in a graphical form, thus the typical graphical for objects and connections can be detected by the method of pattern recognition, for example by use of artificial neural networks. Hence, the elements are predefined and then detected automatically from the provided HMI diagram which simplifies the creation of alarm-areas significantly.

In another advantageous development at least one functional-structure of the plant is provided, wherein the functional-structure describes the structure of the plant-devices and/or connections at least partially in areas, characterized by the further step:
    defining the at least one alarm-area at least partially automatically according to the functional-structure.

Functional-structures are typically generated during planning and engineering of the plant. Therefore functional-structures are typically structured as the plant itself is structured. A plant is usually structured in larger areas within the plant and the larger equipment and/or control solution within a larger area. Advantageously the functional structure is reused to define the respective alarm area automatically. By reusing the functional-structure of the plant for structuring the alarm-areas, it is simpler for the user to review the automatically structured alarm-areas as he is more familiar thereto.

According to another advantageous embodiment the database further contains rule-data defining at least one rule for at least one alarm-order differing at least partially from the flow direction of the directed graph, further comprising the following steps:
    verifying the generated first alarm-order with respect to the rule-data;
    generating at least one partially complete second alarm-order by:
        sorting the alarm-messages according to the rule-data and the flow-direction of the directed graph;
        assigning the sorted alarm-messages to the second alarm-order
    storing at least the first up alarm-message of the second alarm-order.

The rule-data comprises rules which are automatically incorporated in the developed method. The relating rules define an alarm-order that differs at least partially from the flow direction of the directed graph. The alarm-order might differ due to various reasons from the flow-direction, for example in case of backpressure in a pipe system. Backpressure refers to the effect that the pressure remains and causes flow in the same direction, but the flow is reduced due to resistance. A valve located in flow direction behind a valve could be wrongly detected as the root cause, although the root cause is pump tripping. By considering the rule-data, the pump tripping is detected as the root cause. Hence, by incorporating rule-data, also root causes which are differing from the flow direction are advantageously detected.

In a preferred form of the invention,
    the plant comprises several alarm-areas;
    the topology-data further describes a directed graph comprising at least one connection with a related flow direction between respective plant-devices of the several alarm-areas;
    further comprising the following steps:
    retrieving the respective first-up alarm-messages of the several alarm-areas;
    generating at least one partially complete third alarm-order of the respective first-up alarm-messages, by
        sorting the first-up alarm messages according to the flow direction of the directed graph;
        assigning the sorted first-up alarm-messages to the third alarm-order;
    storing at least the first-up alarm-message of the third alarm-order.

A plant typically comprises several alarm-areas, wherein each alarm-area has typically at least one directed graph with a defined flow-direction. The several alarm-areas are also depending on each other by directed graphs. Hence, the claimed method is extended to compare the several first-up alarms of the several alarm-areas.

In other words the first-up alarm of an alarm area must not necessarily be the root cause as the respective alarm area is connected to several further alarm areas which might have further first-up alarms. One alarm-area can cause a problem that is propagated into a further alarm area. Therefore the dependencies between the first-up alarm-messages of the different alarm-areas are also considered.

As the number of alarm-messages is significantly increasing in case of several alarm-areas, each generating at least one alarm-message, the invented method is even more advantageously as more alarm-messages have to be compared among each other. Therefore the generated alarm-messages are sorted across the several alarm-areas depending on the topology. Hence, a tree-structure of the directed-graph which connects the different alarm-areas might be advantageously used for sorting the respective first-up alarms. According to the sorting the alarm-messages are furthermore also priotised and the amount of alarms presented to the user is advantageously reduced.

Advantageously, only one first-up alarm message is presented to the operator and the further alarm-order is only presented after selecting it manually. Therefore, the user is prevented from alarm-flooding and consequently each first-up alarm-message can be taken more seriously.

In a preferred form of the invention, the flow direction describes a material flow direction, an information flow direction, or an energy flow direction.

Based on the respective flow, the dependencies and relationships between different plant-devices in the plant are mapped. The material flow can be a fluid flowing through a pipe, wherein the energy flow is for example energy used for heating up a tank. The information flow can exemplary comprise the information flowing between sensors and an actuators or between control objects and control loops. Furthermore the energy flow is used to describe a direction of the energy flowing in the plant from energy sources to energy sinks.

In order to detect the first-up alarm the material flow is described as directed graph and shows in which order the material is flowing through the plant devices. The material, the energy flow and the information flow therefore describe a direction of the production in a time independent manner and can therefore be used to detect the first-up alarm.

The advantages of this method and their embodiments are discussed in the preceding claims.

These features and further advantageous embodiments are contained in the claims and shall be illustrated by means of exemplary in the figures contained in the drawing attached to this specification.

FIG. 1 depicts exemplary a first computing unit 12 for executing a method according to the invention. The computing unit 12 is connected to an input device 8, to a display 14 and to a first plant 1. The architecture of the first plant 1 comprises two interconnected plant devices, a first plant device 2 and a second plant device 4.

A user 6 specifies his user input 10 via the input-device 8, exemplary a keyboard or a usual computer mouse. The user input 10 is further processed by the computing device 12, wherein further data are provided by the connected first plant 1 and the respective plant devices 2, 4. The display 14 is exemplary used for displaying an alarm order 16 with two alarm messages, wherein each alarm indicates a required action to the user 6. According on the alarm-messages of the alarm-order 16 the user 6 can react and operate the plant-devices 2, 4.

Not depicted in the figure is, that the computing unit 12 can be exemplary provided in a computing cloud, instead of being provided physically. Besides the computing unit 12 can be integrated in a distributed-control-system of the plant 1 itself. The computing unit 1 can comprise a database, or a connection to one or several single databases of the distributed control system of the first plant 1.

Figure 2:
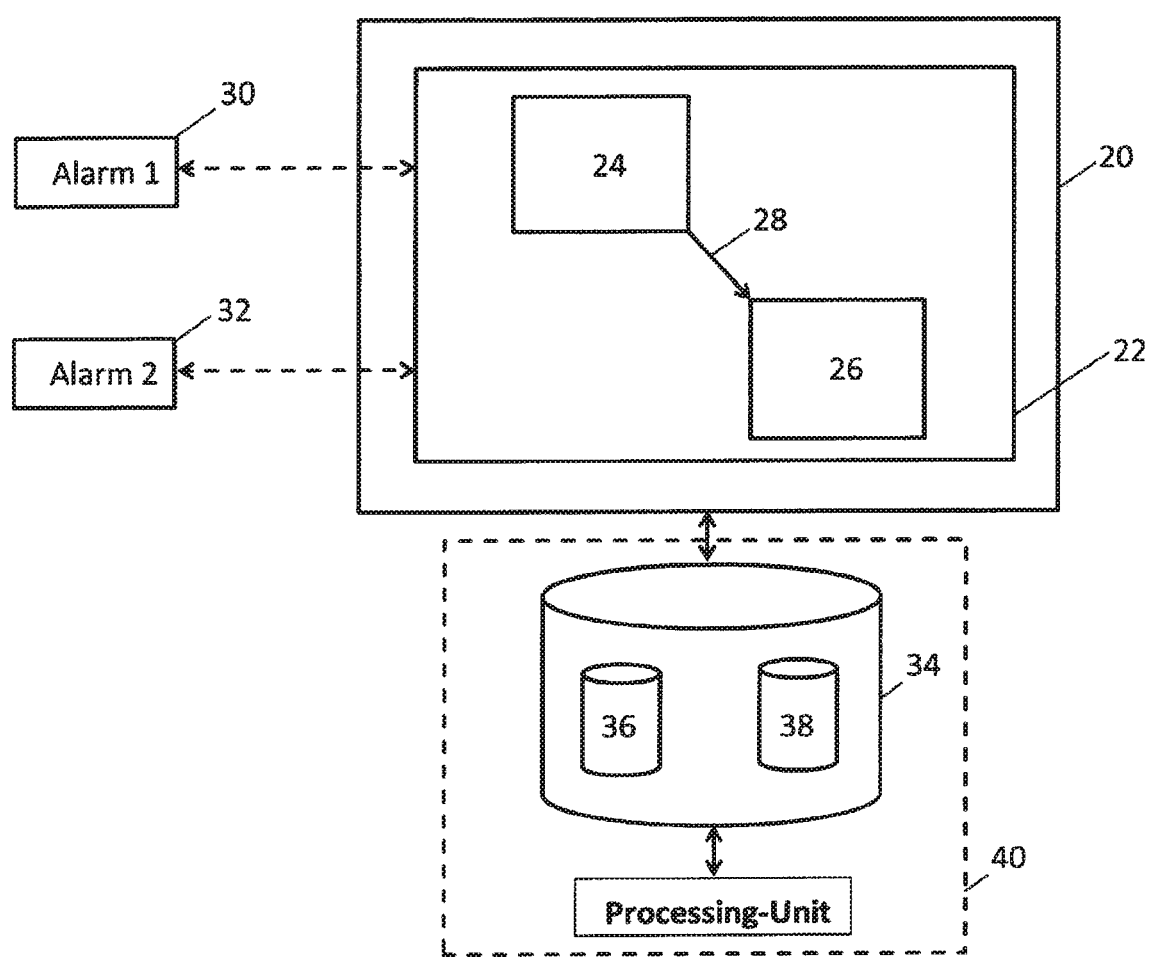
FIG. 2 an exemplary second architecture of a second plant.

FIG. 2 depicts an exemplary architecture of a second plant 20. The second plant 20 comprises two plant devices, a third plant-device 24 which is connected via a first directed graph 28 to a fourth plant devices 26. The two plant-devices 24, 26 form exemplary a first alarm-area 22. The first and second plant-device 24, 26 generate exemplary a first alarm-message 30 and a second alarm-message 32.

The second plant 20 is exemplary connected to a second computing-device 40 which comprises exemplary a first database 34 and a respective processing unit. The first database 34 comprises first alarm-data which associates the first alarm message 30 with the third plant device 24 and the second alarm-message 32 with the fourth plant-device 26. Furthermore, the first database 34 comprises exemplary first topology data 38 containing data which describe a directed graph 28 with a related flow direction between the third plant device 24 and the fourth plant device 26. The directed graph 28 shows exemplary in which order the material flow is going through the active plant-devices 24, 26.

The first alarm-area 22 represents in this example a group of alarms. For each group, the algorithm for finding first-up alarms within this area is applied. Not depicted in the figure is, that the user might also define in which part of the topology the evaluation is supposed to take place.

Not depicted in the figure is the following exemplary algorithm, which might be applied to detect the first-up alarm of the first alarm-area 22:

Step 1: Get one alarm-message 32 and the corresponding plant-device 26.
Step 2: Store the plant-device 26 and the corresponding alarm-message 32 as "first-up alarm".
Step 3: Get another alarm message 30 and the corresponding plant-device 24.
Step 4: Compare the "first-up alarm" with the other alarm message 24 by means of location in the flow direction according to the directed graph 28.
Step 5: If the "first-up alarm" is in an earlier or equal position in the flow direction according to the directed graph 28 continue with step 7.
Step 6: Otherwise, store the other alarm as "first-up alarm"
Step 7: If there are other alarms present with the same time stamp, continue with step 3.
Step 8: Otherwise, "first-up alarm" is the first-up alarm.

An example of the sorting algorithm is given in the following according to FIG. 2:

If a further plant device, which is not depicted, is situated before the plant-devices 24 and 26 in the flow-direction and the further plant device is "valve 1", the third plant-device 24 is "valve 2" and the fourth plant-device is "valve 3" this means that the algorithm works exemplary the following:

Compare "valve 3 alarm" and "valve 2 alarm" and store "valve 2 alarm" as first-up alarm
Compare "valve 2 alarm" and "valve 1 alarm" and store "valve 1 alarm" as first up-alarm
Result: "first-up alarm" is "valve 1 alarm"

Figure 3:
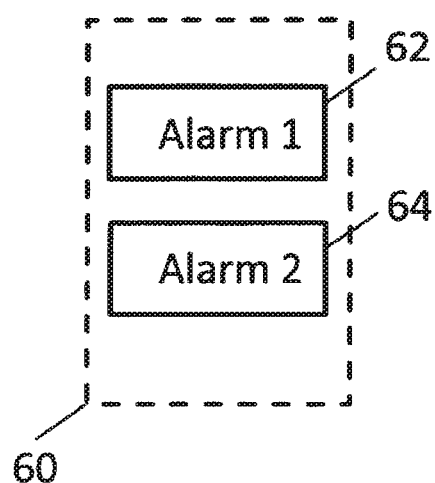
FIG. 3 an exemplary first alarm-order.

FIG. 3 depicts a first alarm-order 60 with two alarm messages 62, 64, wherein the first-up alarm message 62 is exemplary determined by the invented method as being in the flow direction before the third alarm-message 64. Not depicted in the figure is, that only the determined first-up alarm can be presented to the user directly, wherein the further third alarm-message might be available upon a manual request.

Figure 4:
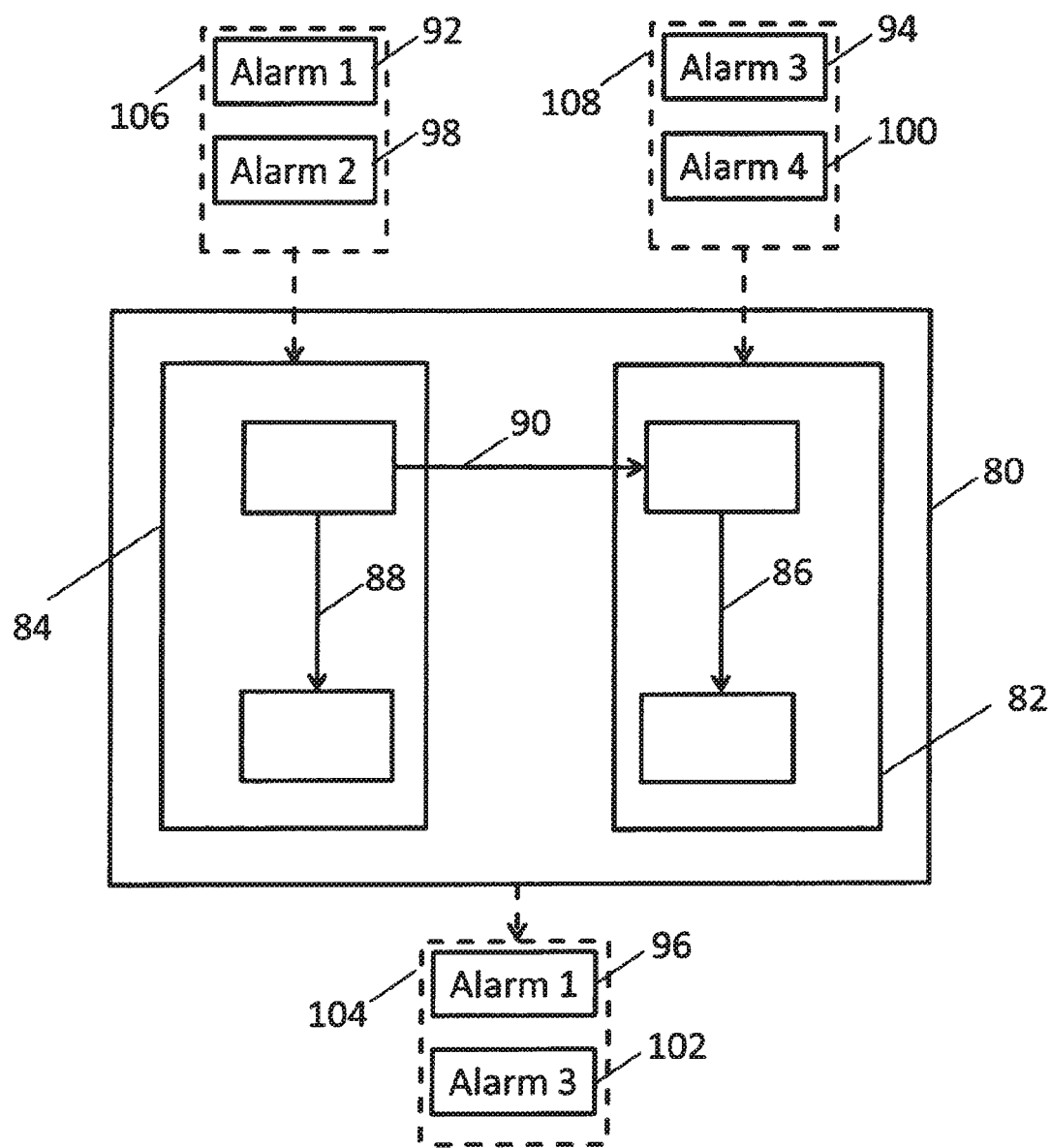
FIG. 4 an exemplary third architecture of a third plant.

FIG. 4 shows a third plant 80 comprising two alarm-areas, a second alarm-area 82 and a third alarm-area 84. The plant devices of the second 82 and third alarm-area 84 are connected by a respective second directed graph 86 and a respective third directed graph 88. The two alarm-areas 82, 84 are connected by a fourth directed graph 90.

Exemplary each of the plant devices of the second alarm-area 82 generates an alarm-message. Wherein the generated alarm messages are sorted according to the invented method and a fourth alarm order 108 is generated, which comprises the fourth first-up alarm message 94 and the fifth alarm-message 100.

Accordingly, the third alarm area 84 comprises two plant devices which generate a second first-up alarm message 92 and a fourth first-up alarm message 98. In this example, each alarm-are 82, 84 generated a separate first up alarm 92, 84, wherein the first-up alarms have been detected by the algorithm according to the invented method.

In a further exemplary step, the flow direction of the fourth directed graph 90 is used to evaluate which alarm message of the second first-up alarm message 92 and the fourth first up alarm message appears earlier. Therefore the fourth directed graph 90, which describes the dependencies between the second alarm-area 82 and the third alarm-area 84 can be used for the further evaluation. Hence, the second and the fourth first-up alarm message are compared according to the invented method, wherein the evaluation results exemplary in the hierarchy depicted in the third alarm-order 104. According to the exemplary flow direction of the fourth directed graph the first-up alarm message of the third alarm area 84 is before the first-up alarm message of the second alarm-area 82.

Figure 5:
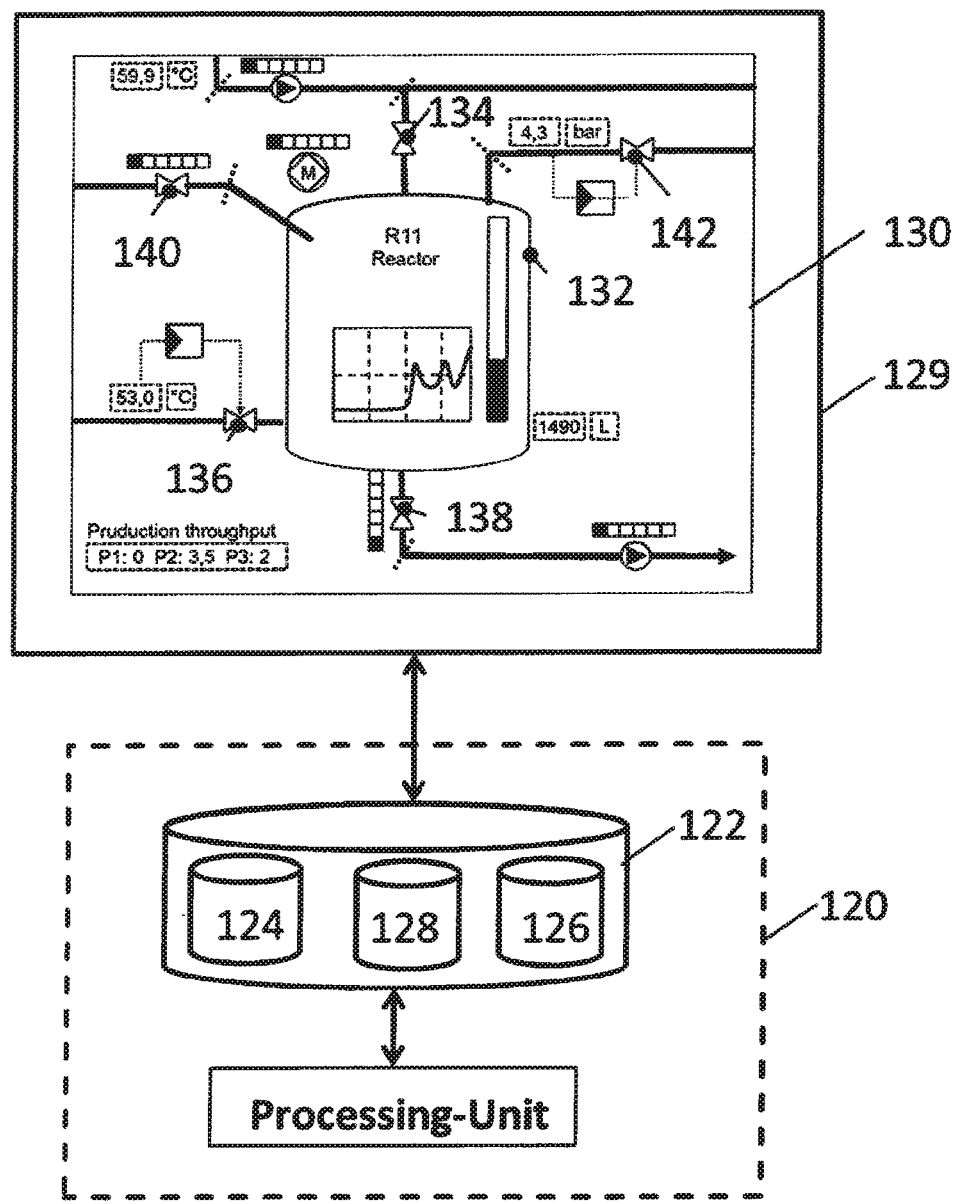
FIG. 5 an exemplary fourth architecture of a fourth plant.

Therefore the comparison procedure can be used to hierarchically arrange the alarms of different alarm-areas. If the first-up alarm of one alarm-area is not the root-cause of the failure, the hierarchy shows the dependencies to different alarm-areas. Hence, the operator can navigate through the hierarchy and evaluate the next alarms until the root-cause has been found FIG. 5 depicts an exemplary third architecture of a third plant. A fourth alarm-area 129 is defined by a first diagram 130 of the plant. The first diagram 130 comprises exemplary several elements 132, 134, 136, 138 and 140. Such a diagram, which can be exemplary an HMI diagram might be presented to a use on a screen of a process visualization system for example. In the center of the diagram is a first element 132 situated, which might be a tank of a reactor. Associated to the tank and within its boundaries is a level display. A larger number of pipes respectively pipe segments is representing material connections from and to the tank.

For influencing the material flow through the connections several elements are foreseen, exemplary a second element 134, third element 136, fourth element 138, fifth element 140 and a sixth element 142. The elements are exemplary valves which can become opened, closed or brought in any partly opened state.

The plant comprising the fourth alarm-area is connected to the third computing-unit 120, which comprises a second database 122 with second alarm-data 124, second topology-data 126 and first rule-data 128. The second database 122 is connected to the processing unit.

Each of the elements 132, 134, 136, 138, 140 can exemplary generate at least one alarm-message. Within the alarm-area 129, the alarm-messages are exemplary evaluated for each alarm that appears. In case that only a single alarm-message appears it is directly shown to the operator. When more than one alarm appears within a certain predefined time span the topology according to the invented method is used to detect the first-up alarm.

Not depicted in the figure is, that the first diagram 130 might be an HMI diagram which can be available in a meta-language, so that additional information is derivable therefrom. A transfer of an HMI diagram into a computer readable form means preferably a transfer to a computer readable graphical form, so that methods of pattern or character recognition might become applied thereon. A"PDF" or "JPEG" file but also the description of an HMI diagram in a meta-language is typically already a suitable computer readable form, whereas for example a plot on a paper has to be transferred to a computer readable form by scanning them. During production process of a plant also a screenshot of an HMI diagram contains suitable information for generating model data of a plant and deriving the plant-topology thereof.

Not depicted in the figure is, that also constructional drawings might contain suitable information about the topology of a plant or a sub-part thereof.

Figure 6:
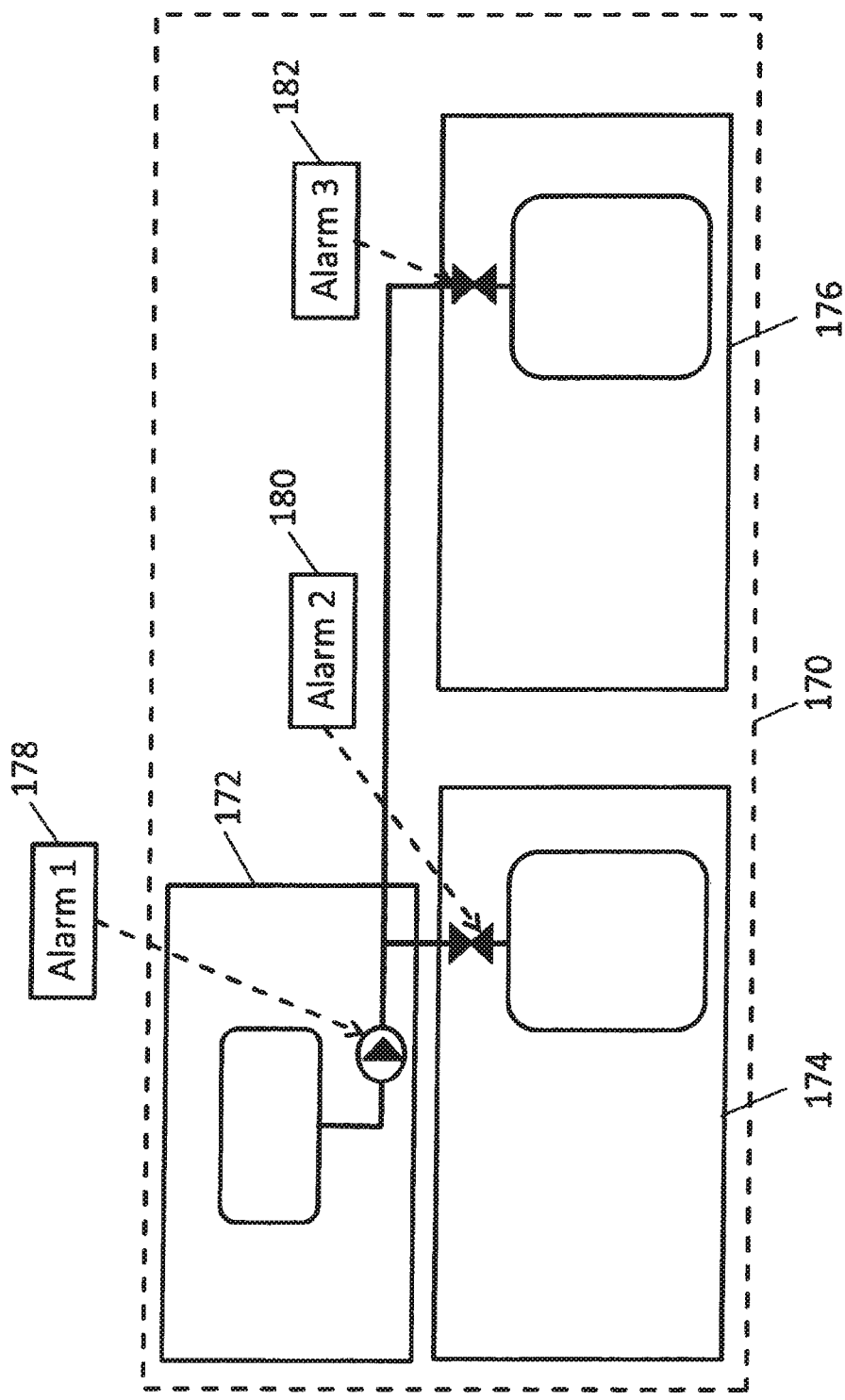
FIG. 6 an exemplary fifth architecture of a fifth plant.

FIG. 6 depicts an exemplary fifth architecture of a fifth plant. The fifth plant 170 comprises three different alarm-areas: a seventh alarm-area 172, eights alarm-area 174 and a ninth alarm area 176. Each of the alarm-areas 172, 174, 176 comprises at least one element. In this example the at least one element is a valve, wherein further elements are not depicted. In this example only the first-up alarms of the single alarm-areas are depicted. The valve of the seventh alarm-area 172 generates a fifth first up-alarm (Alarm 1), the valve of the eights alarm-area 174 generates a sixth first-up alarm 180 (Alarm 180) and the valve of the ninth alarm-area 176 generates a seventh first-up alarm 182 (Alarm 3). Exemplary each first-up alarm appeared one by one, but the time stamp might be the same. Hence, it is unknown which of the single first-up alarms appeared first.

In this example one of the alarm-areas 172, 174, 176 caused a first-up alarm which is propagated into another alarm area. The respective first-up alarm messages 178, 180, 182 are detected by the algorithms described above.

Again, the dependencies and flow directions between the alarm-areas is used to evaluate which alarm of the three first-up alarms 178, 180, 182 appeared earlier.

Figure 7:
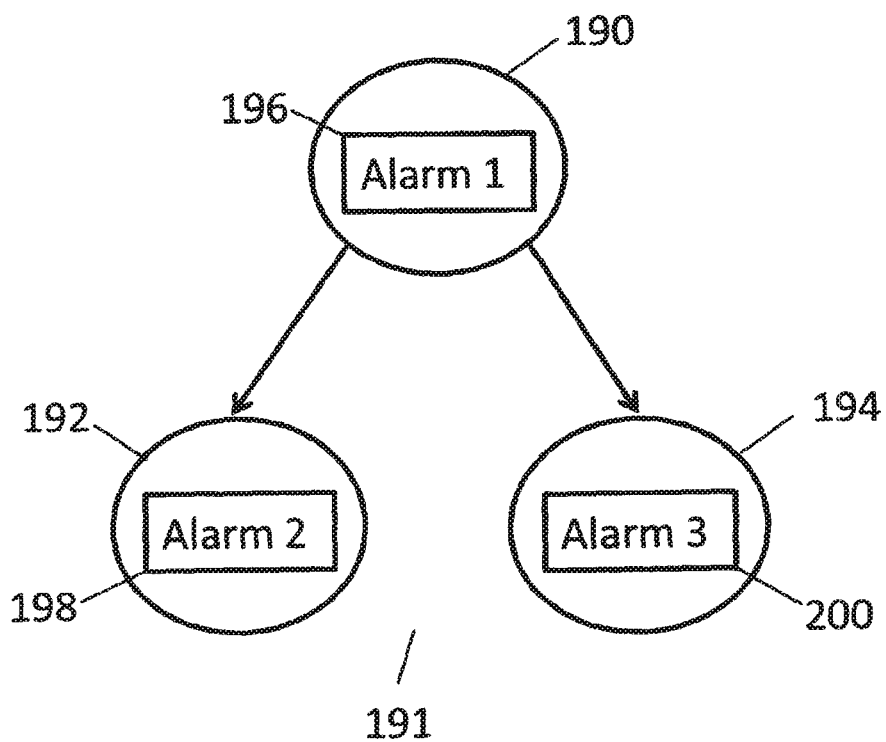
FIG. 7 an exemplary directed graph.

FIG. 7 shows a directed graph 191 comprising three different alarm-areas: a tenth alarm-area 190, an eleventh alarm-area 192, and a twelfth alarm-area 194, wherein each of the alarm-areas generates a respective first-up alarm: the tenth alarm-area 190 generates an eights first-up alarm 196 (alarm 1), the eleventh alarm-area 192 generates a ninth first up-alarm 198 (alarm 2) and the twelfth alarm-area 194 generates a tenth first-up alarm 200 (alarm). The directed graph 191 might represent the example depicted in FIG. 6, wherein the directed graph represents the architecture of the fifth plant, wherein the different alarm-messages (Alarm 1, Alarm 2, Alarm 3) might be exemplary the same as in the previous FIG. 6. The directed graph 191 exemplary represents the dependencies between the different alarm-areas, based on the flow.

Figure 8:
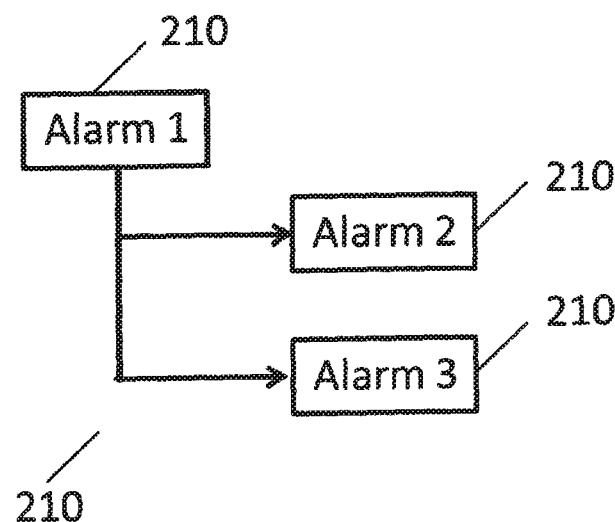
FIG. 8 an exemplary alarm-hierarchy.

FIG. 8 depicts an exemplary alarm-hierarchy 210. The graph comprises exemplary a hierarchical structure with an eleventh first up-alarm 212, a twelfth first up-alarm 214 and a thirteenth first up-alarm 216. The graph might exemplary refer to the previous FIGS. 6 and 7. The alarm-hierarchy is automatically rebuilt accordingly if only some of the plant-devices rise alarm-messages.

Figure 9:
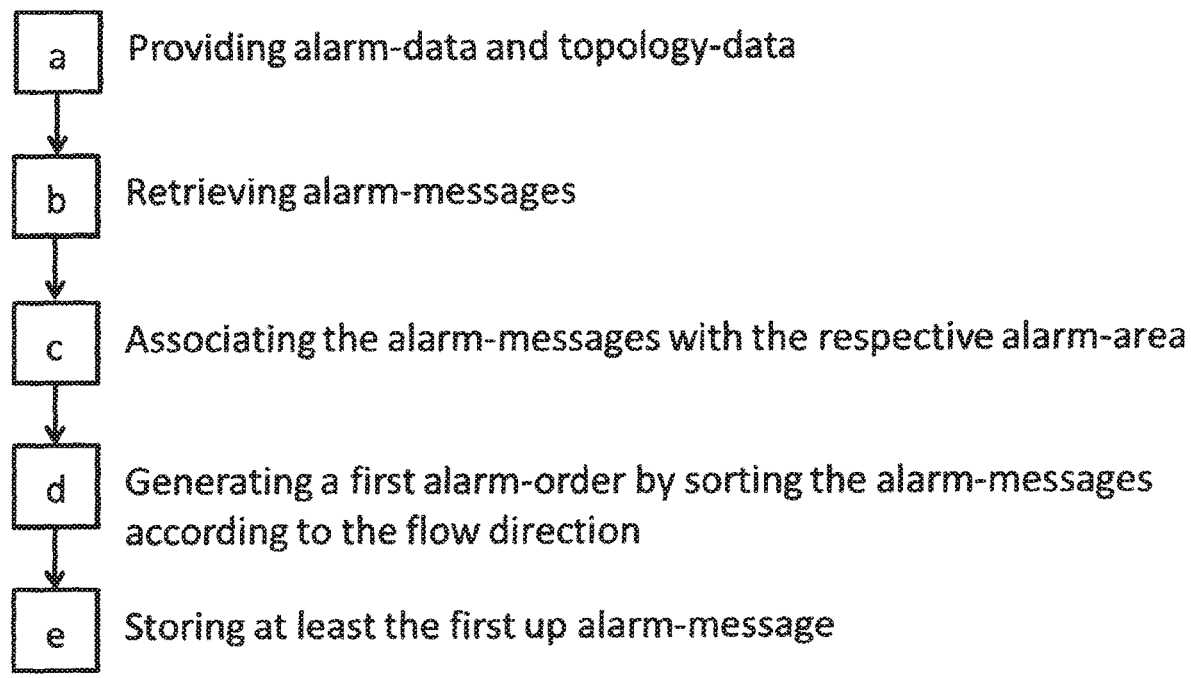
FIG. 9 an exemplary sequence diagram.

FIG. 9 depicts an exemplary sequence diagram illustrating the steps according to the present invention.

In a first step "a" alarm-data and topology-data are provided, wherein alarm-data describes the relation between the respective plant-devices and respective assigned alarm-area. The topology-data describes a directed graph comprising a connection with a related flow direction between the respective plant-devices of the respective assigned alarm-area.

In a second step "b" the alarm-messages are retrieved from plant-devices.

In a third step "c" the alarm-messages are associated with the respective alarm-area according to the alarm-data. The association to the alarm-areas is later used to find the first-up alarms inside those and to visualize dependencies between the groups. It might be also used to visualize dependencies between alarm-areas and stand-alone alarms.

In a fourth step "d" at least one partly complete first alarm-order of the alarm-messages of the at least one alarm-area is generated by sorting the alarm-messages according to the flow direction of the directed graph and then assigning the sorted alarm-messages to the first alarm-order. The generated first alarm-order is instantaneously presented to the user via the display and the user is directed to the first-up alarm message so that a reaction of a user can advantageously delivered quickly.

In a fifth step "e" at least the first-up alarm-message of the first alarm-order is stored, exemplary on the database of the computing device, or in a database of the distributed-control-system.

Figure 10:
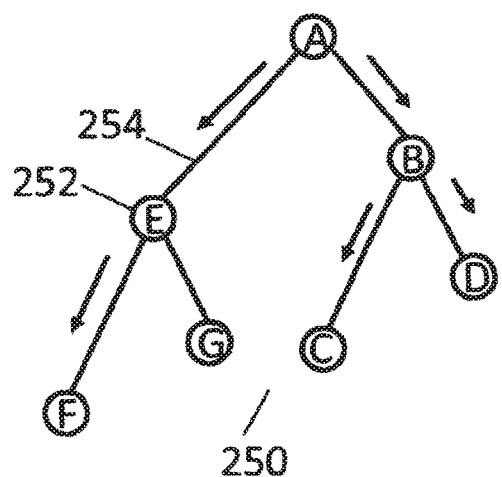
FIG. 10 an exemplary tree structure.

FIG. 10: depicts an exemplary tree structure 250 with nodes 252 and edges 254. The nodes 252 represent the plant-devices or the alarm-areas and the edges 254 represent the connections between nodes 252 and therefore between the plant-devices and/or alarm-areas. Hence, the tree structure 250 represents a directed-graph which enables the detection of the root-cause, which is exemplary a first-up alarm.

In the depicted tree-structure, the node labeled "B" has two children, labeled "C" and "D", and one parent, labeled "A". The root node, labeled "A", which is situated on top of the tree-structure has no parent node. The arrows placed next to the edges symbolize the direction of the tree-structure.

The tree-structure as a data structure is a linked tree with a group of nodes, where each node might equal an alarm-area and a list of references to other nodes, exemplary its children. The data structure defines a directed graph as it may have several references to the same node, wherein only a corrupt linked list may have a loop. Thus, there might also be the requirement that each node has at most a single parent, except for the root node, and a tree that violates this might be a corrupt tree. Tree-structures can be advantageously implemented by references to the root node.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 First plant
2 First plant-device
4 Second plant-device
6 User
8 Input-device
10 User-input
12 First computing-unit
14 Display
16 Alarm-order
20 Second plant
22 First alarm-area
24 Third plant-device
26 Fourth plant-device
28 First directed graph
30 First alarm-message
32 Second alarm-message
34 First database
36 First alarm-data
38 First topology-data
40 Second computing-unit
60 First alarm-order
62 First first-up alarm-message
64 Third alarm-message
80 Third plant
82 Second alarm-area
84 Third alarm-area
86 Second directed graph
88 Third directed graph
90 Fourth directed graph
92 Second first-up alarm-message
94 Fourth first-up alarm-message
96 Fourth first-up alarm-message
98 Fourth alarm-message
100 Fifth alarm-message
102 Sixth alarm-message
104 Third alarm-order
106 Second alarm-order
108 Fourth alarm-order
120 Third computing-unit
122 Second database
124 Second alarm-data
126 Second topology-data
128 First rule-data
129 Fourth alarm-area
130 First diagram
132 First element
134 Second element
136 Third element
138 Fourth element
140 Fifth element
142 Sixth element
170 Fifth plant
172 Seventh alarm-area
174 Eights alarm-area
176 Ninth alarm-area
178 Fifth first up-alarm
180 Sixth first up-alarm
182 Seventh first up-alarm
190 Tenth alarm-area
191 Directed Graph
192 Eleventh alarm-area
194 Twelfth alarm-area
196 Eights first up-alarm
198 Ninth first up-alarm
200 Tenth first up-alarm
210 Alarm hierarchy
212 Eleventh first up-alarm
214 Twelfth first up-alarm
216 Thirteenth first up-alarm
250 Tree structure
252 Node
254 Edge

The invention claimed is:

1. A method for sorting alarm-messages of a plant having at least one alarm-area each having at least two plant-devices connected by at least one connection, wherein the at least one alarm-area is defined so that the plant-devices and respective connection provide a directed graph, the method comprising:
   a) providing at least one database including alarm-data and topology-data, the alarm-data at least partially describing a relationship between respective plant-devices and a respective assigned alarm-area, and the topology-data describing the directed graph including the connection with a related flow direction between the respective plant-devices of the respective assigned alarm-area;
   b) retrieving the alarm-messages from the plant-devices;
   c) associating, at least in part, the alarm-messages with a respective alarm-area according to the alarm-data;
   d) generating at least one partly complete first alarm-order of the alarm-messages of the at least one alarm-area by sorting the alarm-messages according to the flow direction of the directed graph, the flow direction describing a material flow direction, an information flow direction, or an energy flow direction between the respective plant-devices of the respective assigned alarm-area, by navigating from specific alarm-messages backward in the flow direction of the directed graph to evaluate whether an alarm has been propagated from a plant-device located at a topologically earlier point, the sorting comprising comparing the alarm-messages according to location in the flow direction and time-stamping of the alarm-messages so as to determine a first-up alarm-message, and by assigning sorted alarm-messages to the first alarm-order; and
   e) storing at least the first-up alarm-message of the first alarm-order.

2. The method of claim 1, further comprising:
   reducing the directed graph to relevant plant-devices which are generating alarm-messages, before the generating d).

3. The method of claim 1, wherein a diagram of the plant and at least one respective alarm-area template is provided for defining the at least one alarm-area at least partly automatically,
   wherein the at least one respective alarm-area template includes information relating to a structure of a typical alarm-area with typical plant-devices and/or connections,
   further comprising:
   searching plant-devices and/or respective connections from the diagram according to the structure of at least one respective alarm-area template;
   assigning at least partly recognized typical plant-devices and/or respective connections to sections of the structure of the respective alarm-area template;
   defining the at least one alarm-area at least partly automatically by assigning the typical plant-devices and/or respective connections of the at least one respective alarm-area template.

4. The method of claim 3, which detects elements and/or connections so as to recognize a pattern.

5. The method of claim 4, wherein the connections include a valve, flow pipe segment, tanks pump, drive, sensor, or combination of two or more of any of these.

6. The method of claim 4, wherein the elements include plant-devices.

7. The method of claim 1, wherein at least one functional-structure of the plant is provided,
   wherein the at least one functional-structure describes the structure of the plant-devices and/or connections at least partially in areas, the method further comprising:
   defining the at least one alarm-area at least partially automatically according to the at least one functional-structure.

8. The method of claim 1, wherein the at least one database further includes rule-data defining at least one rule for at least one alarm-order differing at least partially from the flow direction of the directed graph,
   wherein the method further comprises:
   verifying a generated first alarm-order with respect to the rule-data;
   generating at least one partially complete second alarm-order by sorting the alarm-messages according to the rule-data and the flow-direction of the directed graph, and by assigning sorted alarm-messages to the second alarm-order; and
   storing at least the first up alarm-message of the second alarm-order.

9. The method of claim 1, wherein the plant includes several alarm-areas,
   wherein the topology-data further describes the directed graph including a connection with a related flow direction between respective plant-devices of several alarm-areas,
   the method further comprising:
   retrieving the respective first-up alarm-messages of the several alarm-areas;
   generating at least one partially complete third alarm-order of respective first-up alarm-messages, by sorting the first-up alarm messages according to the flow direction of the directed graph, and by assigning sorted first-up alarm-messages to a third alarm-order; and
   storing at least the first-up alarm-message of the third alarm-order.

10. The method of claim 1, wherein the flow direction describes the material flow direction.

11. The method of claim 1, wherein the flow direction describes the information flow direction.

12. The method of claim 1, wherein the flow direction describes the energy flow direction.

* * * * *